United States Patent

[11] 3,633,258

[72] Inventor Ernest B. Szabo
 4301 Lincoln Boulevard, Marina Del Rey,
 Calif. 90291
[21] Appl. No. 39,709
[22] Filed May 22, 1970
[45] Patented Jan. 11, 1972

[54] INSERT TOOL HOLDER AND CUTTING TOOL THEREFOR
 10 Claims, 5 Drawing Figs.

[52] U.S. Cl. .................................................. 29/105,
 29/102
[51] Int. Cl. ..................................................... B26d 1/12
[50] Field of Search............................................ 29/96, 97,
 102, 102.1, 98, 105, 105.1

[56] References Cited
 UNITED STATES PATENTS

| | | | |
|---|---|---|---|
| 1,234,769 | 7/1917 | Kelley .......................... | 29/102.1 X |
| 2,924,129 | 2/1960 | Munro........................... | 29/102 X |
| 2,506,338 | 5/1950 | Briney, Jr. .................... | 29/102 X |
| 1,052,400 | 2/1913 | Baker............................ | 29/102 |

FOREIGN PATENTS 1,193,236  5/1970  Great Britain................  29/102

*Primary Examiner*—Harrison L. Hinson
*Attorney*—Mahoney, Hornbaker & Schick

ABSTRACT: A longitudinally extending tool holder rotatable about a longitudinal axis thereof has a transversely extending cutting tool pocket at an end thereof, said pocket terminating transversely inwardly in a longitudinally extending pocket wall transversely across the tool holder and terminating at its extremities in outwardly angled clamping shoulders. A transversely extending cutting tool has symmetrical, transversely opposite, arcuate, cutting side edges separating symmetrical, opposite, clamping side edges. The clamping side edges have outwardly angled extremities matching the clamping shoulders of the tool holder pocket wall so that the cutting tool may be positioned with a center opening thereof over an offset tool clamping pin within the tool pocket and selective adjustment of either the clamping pin or the holder pocket wall will clamp the pocket wall clamping shoulders against the angled extremities of a tool clamping side edge securing the cutting tool on the tool holder. The symmetry of the cutting tool provides the same reversible either or both of longitudinally and transversely with the same clamping securement on the tool holder.

PATENTED JAN 11 1972 3,633,258
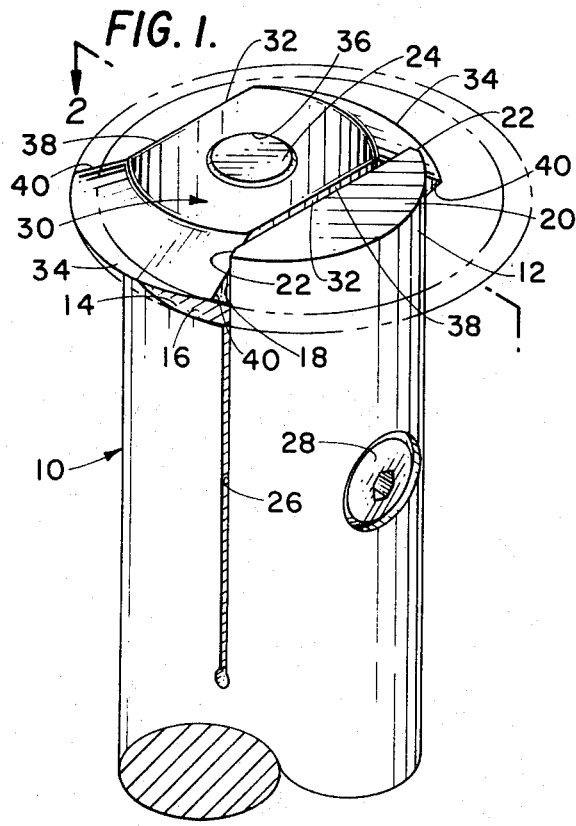
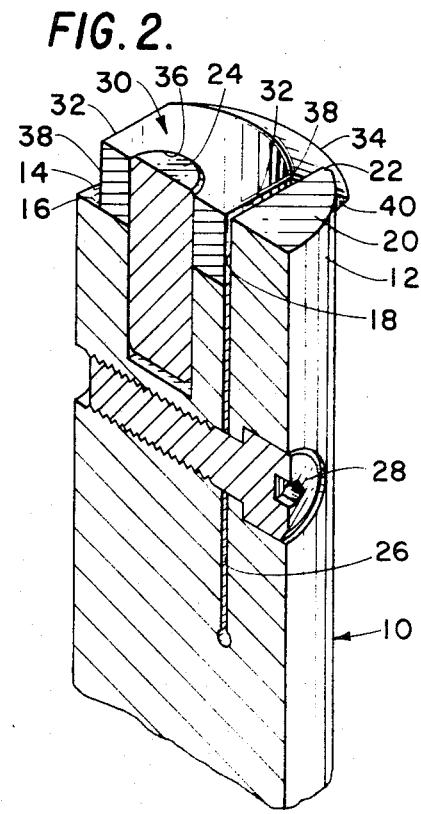
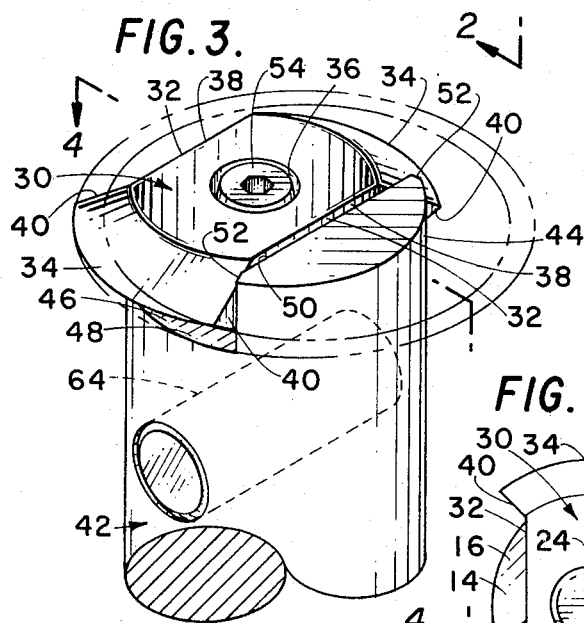
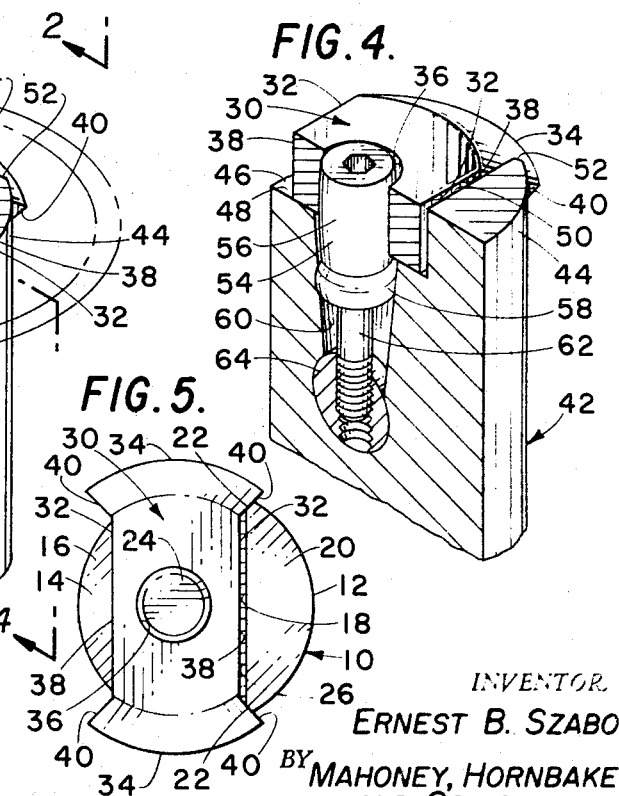
INVENTOR.
ERNEST B. SZABO
BY MAHONEY, HORNBAKER
AND SCHICK
ATTORNEYS

INSERT TOOL HOLDER AND CUTTING TOOL THEREFOR

BACKGROUND OF THE INVENTION

This invention relates to an insert tool holder and cutting tool therefor, and more particularly, to a unique formation of tool holder and related cutting tool combination providing simple and positive securement of the cutting tool on the tool holder, yet with versatility in cutting tool positioning on said tool holder. In all forms of the unique tool holder and cutting tool combination of the present invention, certain symmetry of formation of the cutting tool is provided so that the cutting tool may be reversed in certain directions and always properly present a cutting edge or surface for carrying out working operations. In the optimum form of the unique tool holder and cutting tool combination of the present invention, the cutting tool in any of its clamped positions on the tool holder presents cutting edges or surfaces for either right-hand or left-hand tool holder rotation with the cutting tool still being reversible in a multiplicity of directions for presenting new portions of the cutting edges or surfaces in carrying out said working operations. Thus, the present invention accomplishes maximum versatility with a single cutting tool reducing tool sharpening and tool replacement to a minimum.

Various prior forms of tool holder and cutting tool combinations have heretofor been provided, most of which have merely presented a single tool cutting surface in a single position to carry out a particular working operation. For instance, in most earlier forms of tool holders and cutting tools, the cutting tool consists of a cutting bar having a particularly formed cutting surface at one end thereof and a tool holder is arranged to clamp the cutting bar with the cutting surface thereof extending outwardly at one side of the tool holder for engagement with a work piece upon tool holder rotation. The principal deficiencies with this prior simple form of tool holder and cutting tool bar arrangement is that the cutting tool bar is a single purpose tool operable only in a single direction and, therefore, having absolutely no versatility.

Other forms of prior tool holder and cutting tool combinations of a more complicated nature have incorporated some versatility in the sense that the cutting tools are sometimes singularly reversible for presenting a new cutting edge. In every case, to my knowledge, however, in order to provide the necessary cutting relief in the cutting surfaces thereof, it has still been necessary to form the cutting tools of a single directional nature. Furthermore, the prior methods used for clamping the cutting tools on the tool holders have frequently lacked the necessary rigidity and it has been difficult with such prior constructions to obtain the desired working conditions and results without an extensive period of adjustment and manipulation.

This problem of rigidly clamping the cutting tool on the tool holder is even more greatly magnified when it is considered that tool holder and cutting tool combinations must be provided for use with varying size of work pieces, from relatively minute sizes up to extremely large sizes. Also, there are many occasions where the working operation being performed must be accomplished in a very limited internal space within the work piece, again compounding the size and clamping problem. Thus, prior to the unique tool holder and cutting tool combination of the present invention, such prior constructions have been extremely lacking in combined versatility of cutting tool formation and mounting with the added requirement of relatively simple, yet secure clamping on the tool holder.

OBJECTS AND SUMMARY OF THE INVENTION

It is, therefore, an object of this invention to provide an insert tool holder and cutting tool therefor which may be constructed with virtually any degree of versatility, and in the optimum form, provides complete versatility capable of incorporation in a tool holder and cutting tool combination of virtually any size. In one form of the present invention, the tool holder and cutting tool combination may be provided with opposed and symmetrical clamping surfaces with an arcuate, self-relieving cutting surface extending therebetween so that the cutting tool may be reversed between the two clamping surfaces and will present different portions of the same cutting surface performing the working operation. In another form of the present invention, merely a single clamping surface is provided with opposed and symmetrical cutting surfaces so that the cutting surfaces may be reversed using the same clamping surface for presenting entirely different cutting surfaces to perform the working operation. In the optimum form of the present invention, opposed and symmetrical clamping surfaces separate opposed and symmetrical cutting surfaces so that the cutting tool may be reversed in virtually any direction and will present a minimum of four cutting surface portions for performing the working operation, with the still added feature of providing the cutting tool dual directional for either right-hand or left-hand rotation of the tool holder.

It is a further object of this invention to provide an insert tool holder and cutting tool therefore having the foregoing advantageous versatility features wherein a maximum securement or clamping of the cutting tool on the tool holder is obtained regardless of the positioning or changed positioning of the cutting tool relative to the tool holder. In even the simplest form of the present invention, wherein the cutting tool is formed with merely a single clamping surface and a single cutting surface, the unique securement relationship between the cutting tool and its tool holder is highly advantageous in view of the firm securement and clamping of the cutting tool on the tool holder preventing undesirable and work piece destroying working movement therebetween. Such secure clamping is provided by a clamping surface on the cutting tool formed with angled end extremities which contact and clamp against extremities of a mating wall of the tool holder, thus producing spaced clamping areas giving maximum secure stability for the cutting tool on the tool holder while spacing the remainder of the cutting tool clamping surface away from the tool holder wall eliminating any possibility of mutual clamping interference. Where the optimum form of cutting tool formation is provided as hereinbefore discussed, both of the cutting tool clamping surfaces, being opposed and symmetrical, are similarly formed so as to produce a similar relationship regardless of the particular cutting tool positioning.

It is also an object of this invention to provide an insert tool holder and cutting tool therefor having all of the foregoing advantageous features, yet which is of an extremely simplified form and may be provided at a minimum of cost. As hereinbefore pointed out, the cutting tool in its optimum form is symmetrical with the opposed clamping edges or surfaces and the opposed cutting edges or surfaces, having a center opening therethrough so as to be capable of patterned formation with a minimum of manufacturing operations. The optimum form of tool holder used in combination with the unique cutting tool merely has an end tool pocket with the described clamping wall and an offset clamping pin projecting into the tool pocket, again being relatively simple in form. For producing the clamping between the cutting tool clamping surface and the tool holder clamping wall, either the tool holder clamping wall may be formed selectively adjustable toward the cutting tool and clamping pin, or the clamping pin may be formed with cam surfaces thereon moving toward the tool holder clamping wall upon selective inward adjustment thereof, in either case, quickly accomplishing the clamping action with a minimum of required adjustable mechanism.

Other objects and advantages of the invention will be apparent from the following specification and the accompanying drawings which are for the purpose of illustration only.

BRIEF DESCRIPTION OF THE DRAWING

FIG. 1 is a fragmentary perspective view showing a first embodiment of the insert tool holder and cutting tool combination of the present invention with the cutting tool mounted in working position;

FIG. 2 is a vertical sectional view looking in the direction of the arrows 2—2 in FIG. 1;

FIG. 3 is a view similar to FIG. 1, but showing a second embodiment of the insert tool holder and cutting tool combination of the present invention with the cutting tool mounted in working position;

FIG. 4 is a vertical section view looking in the direction of the arrows 4—4 in FIG. 3; and FIG. 5 is a top plan view of the insert tool holder and cutting tool combination of FIG. 1.

DESCRIPTION OF THE BEST EMBODIMENTS CONTEMPLATED

Referring to FIGS. 1, 2 and 5 of the drawings, a first embodiment of the insert tool holder and cutting tool combination of the present invention is illustrated and includes a longitudinally or axially extending, cylindrical tool holder generally indicated at 10 which is rotatable in usual manner on a conventional machine tool (not shown) about its central longitudinal axis for carrying out the usual metal working operations. The tool holder 10 at its end 12 is formed with a transversely extending cutting tool pocket 14 having a transverse tool positioning surface 16 terminating transversely inwardly in a transverse clamping wall formed by a minor segment 20 extending transversely across the tool holder end 12. The clamping wall 18 of the cutting tool pocket 14 terminates at its extremities in outwardly angled clamping portions 22, that is, said angled clamping portions angling away from the major portion of the cutting tool pocket 14 and generally toward the tool holder segment 20.

A tool clamping pin 24 is secured in the tool holder 10 projecting axially or longitudinally into the cutting tool pocket 14 through the tool positioning surface 16 and said clamping pin is preferably cylindrical in configuration. Furthermore, the tool clamping pin 24 has the longitudinal axis thereof offset from the longitudinal axis of the tool holder 10, preferably spaced transversely at the opposite side of the tool holder longitudinal axis from the tool positioning surface 16 while remaining centrally aligned with a transverse diameter of the tool holder through the clamping pin longitudinal axis, the tool holder longitudinal axis and normal to transversely midway of the tool pocket clamping wall 18. Finally completing the tool holder 10 formation, in this first embodiment, a longitudinal adjustment slot 26 is formed in the tool holder 10 transversely through said tool holder aligned with and forming a continuation of the tool pocket clamping wall 18 thereby providing the tool holder segment 20 and said clamping wall adjustable transversely toward and away from the tool clamping pin 24, an adjustment screw 28 projecting through the tool holder segment and into the tool holder 10 beyond said adjustment slot spaced longitudinally from the cutting tool pocket 14 for selectively accomplishing such adjustment.

The unique cutting tool is generally indicated at 30 and includes opposed, symmetrical clamping surfaces or clamping edges 32 and opposed, symmetrical cutting surfaces or cutting edges 34, all symmetrical about a central, longitudinally extending, cylindrical pin opening 36. In their symmetry, the clamping surfaces or edges 32 have an intermediate portion 38 terminating at the transverse extremities thereof in outwardly angled end extremities 40 angling transversely along and corresponding to the angled clamping portions 22 of the tool holder clamping wall 18. Also in their symmetry, the cutting surfaces or edges 34 each extend arcuately, preferably on a uniform radius about the pin opening 36, between the opposed clamping surfaces 32, it being noted that the transverse extremities of the cutting surfaces or edges 34 are spaced transversely apart for projecting outwardly at opposite sides of the tool holder 10.

Thus, with the cutting tool 30 positioned in the cutting tool pocket 14 of the tool holder 10 and the tool clamping pin 24 of the tool holder received in the cutting tool pin opening 36, either of the cutting tool clamping surfaces 32 may be presented adjacent the tool holder clamping wall 18. Furthermore, by selected tightening of the adjustment screw 28 of the tool holder 10, the angled clamping portions 22 of the tool holder clamping wall 18 may be brought transversely into clamping engagement with the angled end extremities 40 of the cutting tool clamping surfaces 32 clamping the cutting tool against the tool holder clamping pin 24 as well as at the various abutting angled surfaces. In such positioning of the cutting tool 30 on the toolholder 10, it will be noted that regardless of the cutting tool clamping surface 32 engaged with the tool holder clamping wall 18, the cutting tool cutting surfaces or edges 34 project equally outwardly of the tool holder and, due to the offset positioning of the tool holder clamping pin 24, such cutting surfaces or edges are each radially relieved in opposite directions of rotation of the tool holder 10, that is, as viewed downwardly toward the tool holder end 12, in clockwise toolholder rotation, the generally left-hand tool cutting surface is radially relieved and in counterclockwise rotation, the generally right-hand tool cutting surface is radially relieved.

It is evident, therefore, that due to the symmetry of the various surfaces or edges on the cutting tool 30 and its particular positioning on the tool holder 10, the cutting tool is completely reversible in all directions, one clamping surface 32 over the other, one cutting surface 34 over the other, or merely transversely rotated or reversed so as to, in this optimum form, provide the use of four different cutting surface or edge portions and rotation in either direction. In addition, regardless of the cutting tool 30 positioning on the tool holder 10, clamping or release may be quickly accomplished by a mere selected movement of the adjustment screw 28, the cooperating surfaces between the cutting tool and tool holder ensuring exact and proper clamping regardless of such positioning.

Referring to FIGS. 3 and 4 a second embodiment of the tool holder and cutting tool combination of the present invention is shown with the only alterations being a slightly different clamping arrangement. The cutting tool 30 is virtually identical and includes the clamping surfaces or edges 32, the cutting surfaces or edges 34, the pin opening 36 and the clamping surfaces or edges having the intermediate portion 38 terminating transversely in the angled end extremities 40. The tool holder generally indicated at 42 is, however, slightly altered but does include the same end 44 having the cutting tool pocket 46 formed therein providing the tool positioning surface 48 and clamping wall 50 with the identical angled clamping portions 52.

In this second embodiment, a tool clamping pin 54, although similarly positioned, has an end portion 56 engaged through the cutting tool pin opening 36, an intermediate cam portion 58 inwardly of the cutting tool 30 acting transversely against a tool holder angled cam surface 60, and a threaded adjustment portion 62 threadably engaged in a transversely extending and circumferentially pivotal adjustment bar 64 of the tool holder 42 that is, said adjustment bar 64 being cylindrical, is circumferentially pivotal relative to the tool holder 42. Thus, with the cutting tool 30 positioned over the tool clamping pin 54, and the angled clamping portions 52 of the tool holder clamping wall 50 adjacent the angled end extremities 40 of one of the cutting tool clamping surfaces 32, selective inward adjustment of the tool clamping pin 54 forces the clamping pin cam portion 58 inwardly along the tool holder angled surface 60 to force the clamping pin end portion 56 toward the tool holder clamping wall 50, as permitted by circumferential pivoting of the adjustment bar 64, and thereby the cutting tool 30 toward the tool holder clamping wall 50. Such motion will, therefore, produce virtually the same clamping action as in the first embodiment by relative motion between the cutting tool clamping surface 32 and the tool holder clamping wall 50.

According to the principles of the present invention, therefore, the complete versatility of the cutting tool is provided in both embodiments. Furthermore, secure clamping is quickly accomplished in both embodiments of the invention in a simple and efficient manner. Still further, all of these advantageous features are provided in the insert tool holder and cutting tool combinations of the present invention in easily constructed form relatively inexpensive to provide.

I claim:

1. In an insert tool holder and cutting tool therefor, the combination of: a longitudinally extending tool holder rotatable about a longitudinal axis thereof, a transversely extending cutting tool pocket formed in said tool holder terminating transversely inwardly in a longitudinally extending pocket wall transversely across said tool holder, said holder tool pocket wall having opposite tool clamping transverse extremities; a tool clamping pin mounted on said tool holder projecting longitudinally into said cutting tool pocket and having a generally longitudinally extending axis spaced transversely from said tool holder longitudinal axis; a transversely extending cutting tool received in said holder tool pocket over said tool clamping pin having at least one clamping side edge facing said holder tool pocket wall totally transversely across said tool pocket wall, said tool clamping side edge having opposite end extremities angling transversely toward and positioned adjacent said opposite tool clamping extremities of said holder tool pocket wall, said tool clamping side edge having an intermediate portion between said opposite end extremities spaced at all times from said holder tool pocket wall, said cutting tool having at least one tool cutting side edge beginning adjacent one of said opposite end extremities of said tool clamping side edge and extending in a generally circumferential arc at least partially spaced transversely outwardly of said tool holder; and clamping means for selectively transversely adjusting one of said holder tool pocket wall and said tool clamping pin to clamp said opposite tool clamping extremities of said holder tool pocket wall and said opposite end extremities of said tool clamping side edge.

2. An insert tool holder and cutting tool as defined in claim 1 in which a longitudinal slot is formed in said tool holder longitudinally aligned with said holder tool pocket wall spacing said holder tool pocket wall transversely from a remainder of said tool holder; and in which said clamping means includes a fastener received through a portion of said tool holder transversely across said tool holder slot selectively adjustable for reducing transverse dimensions of said slot to clamp said opposite tool clamping extremities of said holder tool pocket wall and said opposite end extremities of said tool clamping side edge.

3. An insert tool holder and cutting tool as defined in claim 1 in which said clamping means includes cam surfaces between said tool clamping pin and said tool holder for moving said tool clamping pin transversely toward said holder tool pocket wall upon longitudinally inward adjustment of said tool clamping pin relative to said tool holder to move said cutting tool transversely toward said holder tool pocket wall and clamp said opposite end extremities of said tool clamping side edge against said opposite tool clamping extremities of said holder tool pocket wall.

4. An insert tool holder and cutting tool as defined in claim 1 in which said tool clamping side edge is a first tool clamping side edge; and in which said cutting tool includes a second tool clamping side edge opposite said first tool clamping side edge symmetrical thereto and about a tool pin opening receiving said tool clamping pin, said tool cutting side edge being formed with a uniform radius relative to said tool pin opening along said circumferential arc so that said cutting tool may be removed from said tool holder, said tool clamping side edges rotated longitudinally 180° one over the other and said cutting tool replaced and reclamped on said tool holder while said tool cutting side edge upon rotation of said tool holder is radially relieved in either clamped position.

5. An insert tool holder and cutting tool as defined in claim 1 in which said tool cutting side edge is a first tool cutting side edge; and in which said cutting tool includes a second tool cutting side edge opposite said first tool cutting side edge symmetrical thereto and about a clamping pin opening receiving said tool clamping pin therein so that said cutting tool may be removed from said tool holder, rotated longitudinally 180° with one of said tool cutting side edges moving over the other and reclamped on said tool holder.

6. An insert tool holder and cutting tool as defined in claim 1 in which said tool clamping side edge is a first tool clamping side edge and said tool cutting side edge is a first tool cutting side edge; and in which said cutting tool includes a second tool clamping side edge opposite said first tool clamping side edge symmetrical thereto and about a clamping pin opening receiving said tool clamping pin therein, a second tool cutting side edge opposite said first tool cutting side edge symmetrical thereto and about said clamping pin opening, said tool cutting side edges being formed on a uniform radius from said clamping pin opening along said circumferential arcs so that said cutting tool is totally symmetrical and may be removed from said tool holder, rotated 180° either longitudinally or transversely and reclamped on said tool holder.

7. An insert tool holder and cutting tool as defined in claim 1 in which said clamping means includes cam surfaces between said tool clamping pin and said tool holder for moving said tool clamping pin transversely toward said holder tool pocket wall upon longitudinally inward adjustment of said tool clamping pin relative to said tool holder to move said cutting tool transversely toward said holder tool pocket wall and clamp said opposite end extremities of said tool clamping side edge against said opposite tool clamping extremities of said holder tool pocket wall, said tool clamping pin being longitudinally inwardly threadably engaged in an adjustment bar extending transversely of said tool holder generally parallel to said holder tool pocket wall, said adjustment bar being cylindrical and circumferentially pivotal relative to said tool holder permitting said tool clamping pin transverse movement during said inward adjustment of said tool clamping pin.

8. In an insert tool holder and cutting tool therefor, the combination of: a longitudinally extending tool holder rotatable about a longitudinal axis thereof, a transversely extending cutting tool pocket formed in said tool holder terminating transversely inwardly in a longitudinally extending pocket wall transversely across said tool holder; a tool clamping pin mounted on said tool holder projecting longitudinally into said cutting tool pocket and having a generally longitudinally extending axis spaced transversely from said tool holder longitudinal axis; a transversely extending cutting tool received in said holder tool pocket and receiving said tool clamping pin in a clamping pin opening thereof, said cutting tool having at least one clamping side edge facing said holder tool pocket wall totally transversely across said tool pocket wall, said cutting tool having opposite tool cutting side edges each beginning adjacent end extremities of said tool clamping side edge and extending in generally circumferential arcs at least partially spaced transversely outwardly of said tool holder, said tool cutting side edges being symmetrical to each other and about said clamping pin opening and both being formed on a uniform radius from said clamping pin opening; and clamping means for selectively transversely adjusting one of said holder tool pocket wall and said tool clamping pin to clamp said holder tool pocket wall and said tool clamping side edge.

9. An insert tool holder and cutting tool as defined in claim 8 in which said tool clamping side edge is a first tool clamping side edge; in which said cutting tool includes a second tool clamping side edge opposite said first tool clamping side edge extending between said tool cutting side edges, said second tool clamping side edge being symmetrical with said first tool clamping side edge and about said clamping pin opening so that said cutting tool is totally symmetrical and may be removed, rotated 180° either or both longitudinally and transversely and reclamped on said tool holder.

10. An insert tool holder and cutting tool as defined in claim 8 in which said holder tool pocket wall of said tool holder has opposite tool clamping transverse extremities angling oppositely away from said tool pocket; and in which said tool clamping side edge of said cutting tool has opposite end extremities angling transversely along and positioned adjacent said opposite tool clamping extremities of said holder tool pocket wall, said tool clamping side edge having an intermediate portion between said opposite end extremities spaced at all times from said holder tool pocket wall, said opposite end extremities of said tool clamping side edge clamping against said adjacent opposite tool clamping extremities of said holder tool pocket wall upon said clamping adjustment by said clamping means.

* * * * *